United States Patent [19]

Cyzs

[11] Patent Number: 5,691,727

[45] Date of Patent: Nov. 25, 1997

[54] ADAPTIVE POLARIZATION DIVERSITY SYSTEM

[75] Inventor: Baruch Cyzs, Kiryat Motzkin, Israel

[73] Assignee: State of Israel-Ministry of Defense Armament Development Authority-Rafael, Haifa, Israel

[21] Appl. No.: 577,407

[22] Filed: Dec. 22, 1995

[30] Foreign Application Priority Data

Jan. 3, 1995 [IL] Israel ........................................ 112233

[51] Int. Cl.$^6$ ............................ H01Q 21/06; H01Q 21/24
[52] U.S. Cl. ...................... 342/361; 342/362; 342/363; 342/188
[58] Field of Search ..................... 342/361, 362, 342/363, 364, 365, 366, 188

[56] References Cited

U.S. PATENT DOCUMENTS

| | | | |
|---|---|---|---|
| 3,144,647 | 8/1964 | Sichak | 343/100 |
| 3,311,829 | 3/1967 | Gillett . | |
| 3,453,622 | 7/1969 | Kesson | 343/100 |
| 3,680,139 | 7/1972 | Reynolds, Jr. . | |
| 3,735,266 | 5/1973 | Amitay . | |
| 4,112,370 | 9/1978 | Monsen | 325/40 |
| 4,771,288 | 9/1988 | Johnson | 342/188 |
| 5,036,331 | 7/1991 | Dallabetta et al. . | |
| 5,068,668 | 11/1991 | Tsuda et al. | 342/362 |
| 5,075,697 | 12/1991 | Koizumi et al. | 342/361 |

FOREIGN PATENT DOCUMENTS

| 906910 | of 1990 | Japan . |
|---|---|---|
| 6061894 | of 1994 | Japan . |
| 661841 | of 1979 | U.S.S.R. . |
| 1035813 | of 1983 | U.S.S.R. . |

OTHER PUBLICATIONS

Lee, W.C.Y., "Polarization Diversity System for Mobile Radio", IEEE Trans. on Comm.vol. Com-20, No. 5 (Oct. 1972).

Vaughan, R.G., "Polarization Diversity in Mobile Communications", IEEE Transactions in Vehicular Technology, vol. 39 No. 3 (Aug. 1990).

Cox, D.C. et al, "Cross-Polarization Coupling Measured for 800 MHz Radio Transmission In and Around Houses and Large Buildings", IEEE Transactions on Antennas and Propagation, vol. AP-34, No. 1 (Jan. 1986).

*Primary Examiner*—Thomas H. Tarcza
*Assistant Examiner*—Dao L. Phan
*Attorney, Agent, or Firm*—Mark M. Friedman

[57] ABSTRACT

An adaptive polarization diversity system for radio link communication. The system includes a base station antenna for transmitting either a clockwise polarized transmission or a counterclockwise polarized transmission, the transmission including a training pilot signal. The system further includes at least one subscriber unit for receiving the transmission, the unit including a first subscriber unit antenna for receiving a clockwise polarized transmission, a second subscriber unit antenna for receiving a counter-clockwise polarized transmission, and a dual channel receiver for adaptively combining the clockwise polarized transmission with the counterclockwise polarized transmission in proportion to first and second weights, respectively, the dual channel receiver determining the first and second weights so as to substantially optimally receive the training pilot signal.

17 Claims, 4 Drawing Sheets

ADAPTIVE POLARIZATION DIVERSITY SYSTEM

FIELD AND BACKGROUND OF THE INVENTION

The present invention relates to polarization diversity systems for radio link communication in general and in particular to adaptive polarization diversity systems for radio link communication.

It is well known that fading and other signal impairment occur in land-based mobile radio links between a base station and a number of remote subscriber units due to natural and man-made obstacles. Fading and other signal impairment is due to multi-path propagation between the base station and the subscriber units and random orientation of the subscriber unit antennas. Typically, the problem of none frequency selective fading increases proportionally to the velocity of a moving subscriber, the density of built-up areas, the transmission frequency, and the like.

Space diversity systems including pairs of antennas at the base station and at the subscriber units have been proposed to solve the problem of none frequency selective fading. However, space diversity systems require antenna spacings in the order of 30 $\lambda$ at the base station and one wavelength at the subscriber unit which are impractical or inconvenient.

Optimal diversity systems including an adaptive antenna array at the subscriber unit have also been proposed to solve the problem of fading. The effective signal at the subscriber unit is the weighted combination of the signals from the antennas of the antenna array. Therefore, an adaptive antenna array, in effect, acts as a directive array, thereby suffering from the subsequent loss of energy associated with a directive array.

Polarization diversity systems including pairs of antennas at the base station and at the subscriber units have also been proposed to solve the problem of fading. Conventional polarization diversity systems have achieved some success but suffer from a 3 dB power loss due to transmitting in both orthogonal polarizations.

There is therefore a need for an adaptive polarization diversity system for radio link communication which overcomes the disadvantages of conventional polarization diversity systems.

SUMMARY OF THE INVENTION

The present invention is for an adaptive polarization diversity system for radio link communication.

Hence, there is provided according to the teachings of the present invention, an adaptive polarization diversity system for radio link communication comprising: (a) a base station antenna for transmitting either a clockwise polarized transmission or a counter-clockwise polarized transmission, the transmission including a training pilot signal; and (b) at least one subscriber unit for receiving the transmission, the at least one subscriber unit including: i) a first subscriber unit antenna for receiving a clockwise polarized transmission, ii) a second subscriber unit antenna for receiving a counter-clockwise polarized transmission, and iii) a dual channel receiver for adaptively combining the clockwise polarized transmission with the counter-clockwise polarized transmission in proportion to first and second weights, respectively, the dual channel receiver determining the first and second weights so as to substantially optimally receive the training pilot signal.

According to a further feature of the present invention, the dual channel receiver implements a Direct Matrix Inversion (DMI) algorithm for processing a number of samples from each channel thereof so as to determine the first weight and the second weight.

According to a still further feature of the present invention, the dual channel receiver implements a Least Mean Square (LMS) algorithm for processing a number of samples from each channel thereof so as to determine the first weight and the second weight.

According to a yet still further feature of the present invention, the first subscriber unit antenna is spaced from the second subscriber unit antenna.

According to a yet still further feature of the present invention, the first subscriber unit antenna and second subscriber unit antenna are co-located.

According to a yet still further feature of the present invention, the at least one subscriber unit is realized as a vehicle mounted device.

According to a yet still further feature of the present invention, the at least one subscriber unit is realized as a hand held device.

There is also provided according to the teachings of the present invention, an adaptive polarization diversity system for radio link communication comprising: (a) a base station for transmitting a transmission including a training pilot signal, the base station including: i) a first base station antenna for transmitting a first polarized transmission, ii) a second base station antenna for transmitting a second polarized transmission, the second polarized transmission being orthogonal to the first polarized transmission; and b) at least one subscriber unit for receiving the transmission, the at least one subscriber unit including: i) a first subscriber unit antenna for receiving a first transmission, the first subscriber unit antenna sharing a common polarization with the first base station antenna, ii) a second subscriber unit antenna for receiving a second transmission, the second subscriber unit antenna sharing a common polarization with the second base station antenna, and iii) a dual channel receiver for adaptively combining the first polarized transmission with the second polarized transmission in proportion to first and second weights, respectively, the dual channel receiver determining the first and second weights so as to substantially optimally receive the training pilot signal.

According to a further feature of the present invention, the first base station antenna is substantially vertically polarized and the second base station antenna is substantially horizontally polarized.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an adaptive polarization diversity system for radio link communication.

The principles and operation of the adaptive polarization diversity system for radio link communication according to the present invention may be better understood with reference to the drawings and the accompanying description.

Broadly speaking, the adaptive polarization diversity system of the present invention adaptively combines orthogonally polarized signals to render an effective polarization which matches the actual polarization of an incoming received signal. This is achieved by adaptively allocating weights to both orthogonally polarized signals so as to maximize a training pilot signal carried by the incoming signal. The adaptive polarization diversity system can be implemented as either a direct feed adaptive system employing a Direct Matrix Inversion (DMI) algorithm for determining the weights or as a feedback adaptive system employing a Least Mean Square (LMS) algorithm for determining the weights. The diversity scheme is maintained because the multiple reflections of a transmission during multi-path propagation from a base station to a remote subscriber unit presents high de-correlation between the orthogonally polarized components of the received incoming signal.

Furthermore, the adaptive polarization diversity system can be deployed at a base station for uplink radio link communication or at a subscriber unit for downlink radio link communication. Alternatively, the adaptive polarization diversity system can be deployed at both a base station and a subscriber unit for two-way radio link communication. Hence, the adaptive polarization diversity system can be implemented for mobile radio link communication, WLAN radio link communication, telemetric radio link communication, and the like. Mobile radio link communication includes a subscriber unit being realized as vehicle mounted device or a hand held device.

Figure 1:
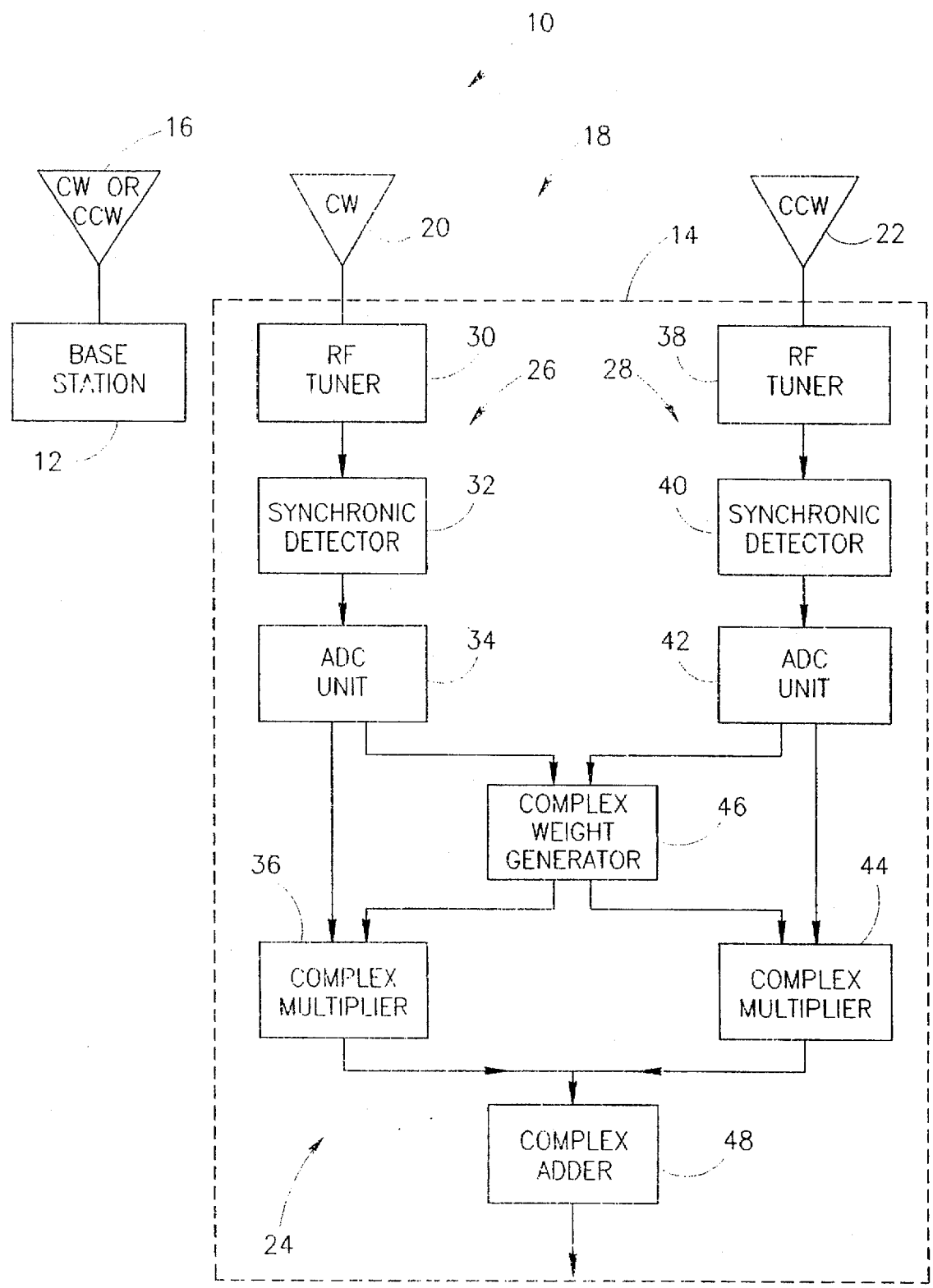
FIG. 1 is a schematic block diagram of a first embodiment of an adaptive circular polarization diversity system for radio link communication implemented as a direct feed adaptive system.

Referring now to the drawings, FIG. 1 illustrates a first embodiment of an adaptive polarization diversity system for radio link communication, generally designated 10, constructed and operative according to the teachings of the present invention. For the purpose of exposition only, adaptive polarization diversity system 10 is depicted for downlink radio link communication from a base station 12 to one or more subscriber units 14 physically located at a subscriber unit site. It should be noted that adaptive polarization diversity system 10 can also be implemented for uplink radio link communication from a subscriber unit to a base station and for two-way radio link communication between a base station and a subscriber unit.

Base station 12 includes an antenna 16 having either a clockwise circular polarization or a counter-clockwise circular polarization. For reasons to become apparent hereinbelow, the transmission from base station 12 carries a modulated training pilot signal. In both cases, some of the transmission from antenna 16 arrives at subscriber unit 14 as a clockwise polarized transmission and the remainder as a counter-clockwise polarized transmission due to multiple multi-path reflections. The distribution between the two circular polarized transmissions depends on a number of factors including the multi-path between and base station 12 and subscriber unit 14, and the like.

Hence, subscriber unit 14 includes an antenna pair 18 including a subscriber unit antenna 20 having a clockwise circular polarization to receive the clockwise polarization component of the transmission and a subscriber unit antenna 22 having a counter-clockwise circular polarization to receive the counter-clockwise polarization component of the transmission. Antennas 20 and 22 of antenna pair 18 are preferably co-located such that subscriber unit 14 can be readily realized as a vehicle mounted device or a hand held device. Alternatively, antennas 20 and 22 can be deployed in a spaced apart configuration.

Subscriber unit 14 includes a dual channel receiver, generally designated 24, for adaptively combining signals corresponding to the clockwise and counter-clockwise polarized components received by antennas 20 and 22, respectively, according to first and second weights, respectively, so as to optimally receive a transmission from base station 12 to subscriber unit 14. Dual channel receiver 24 can be implemented as part of the demodulator of subscriber unit 14 or, alternatively, exterior thereto.

Thus, dual channel receiver 24 includes a first channel, generally designated 26, for processing the clockwise polarized component of the transmission received by antenna 20 and a second channel, generally designated 28, for processing the counter-clockwise polarized component of the transmission received by antenna 22. It should be noted that channels 26 and 28 are required to possess identical group delay and gain properties so as to ensure optimum combination within the received signal bandwidth.

Channels 26 and 28 each include four functional units which are now described with reference to channel 26. First, channel 26 includes an RF tuner 30 for providing an IF signal corresponding to the clockwise polarized component of the transmission received at antenna 20. Second, channel 26 includes a synchronic detector 32 for providing the real in-phase and imaginary quadrature components of the IF signal. Synchronic detector 32 preferably down converts the IF signal to a baseband frequency or to a near baseband frequency. Third, channel 26 includes an ADC unit 34 for sampling the in-phase and quadrature components to provide a sequence of digitized complex samples. And lastly, channel 26 includes a complex multiplier 36 for multiplying pairs of complex numbers consisting of a complex sample from ADC unit 36 and a complex weight provided by a complex weight generator 46 described hereinbelow. In a similar manner, channel 28 includes an RF tuner 38, a synchronic detector 40, an ADC unit 42 and a complex multiplier 44.

In the case that adaptive polarization diversity system 10 is implemented as direct feed adaptive system, complex weight generator 46 determines the weights to be allocated to the signals from each of channels 26 and 28 through the application of a Direct Matrix Inversion (DMI) algorithm so as to optimally receive the modulated training pilot signal transmitted as part of a transmission from base station 12 to subscriber unit 14. Typically, the DMI algorithm processes a sufficient number of samples from complex multiplier 36 and complex multiplier 44 so as to achieve a good estimation of the optimum weights. Finally, dual channel receiver 24 includes a complex adder 48 for adaptively combining the complex numbers from complex multipliers 36 and 44 according to the weights determined by complex weight generator 46.

Figure 2:
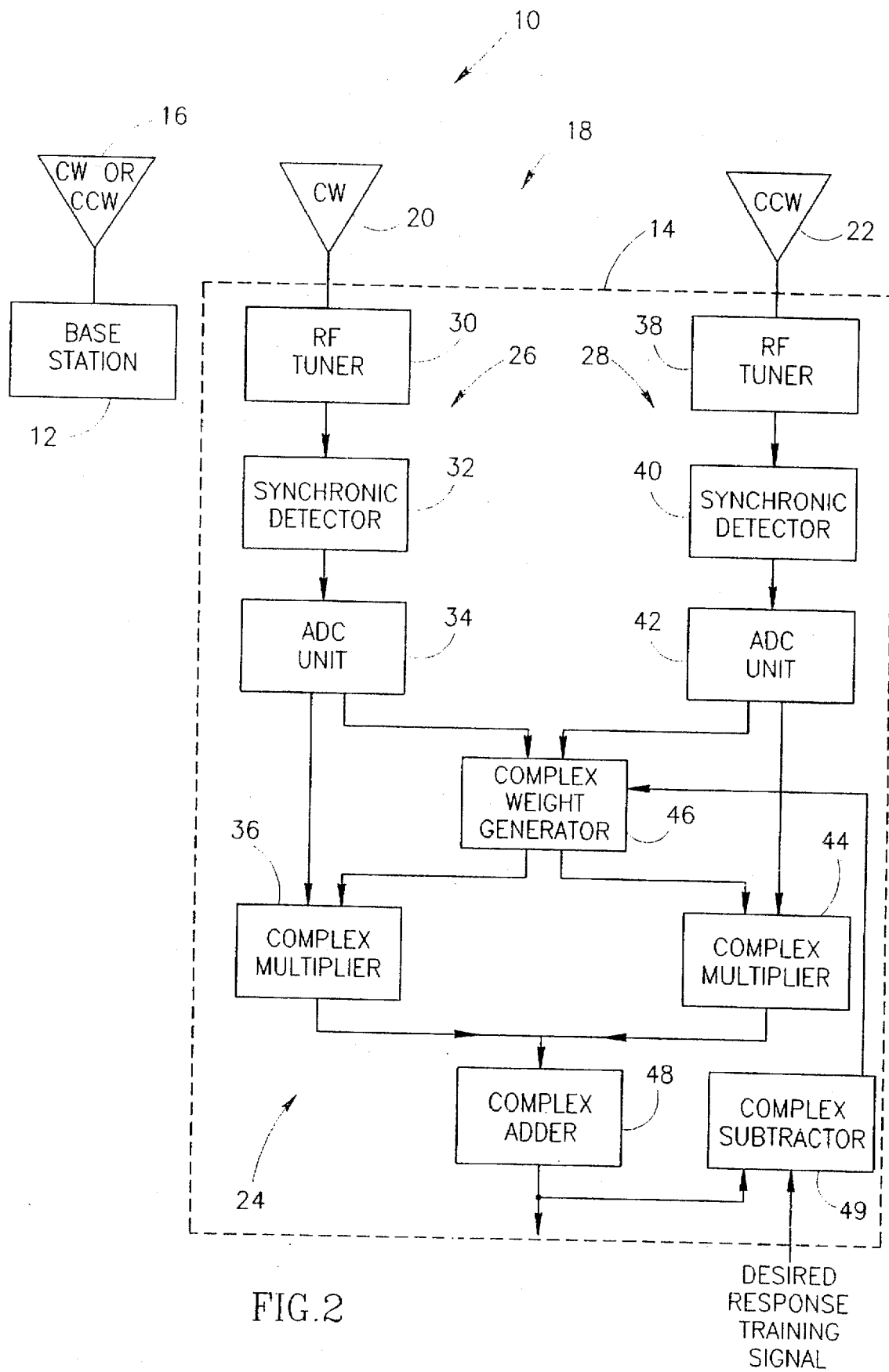
FIG. 2 is a schematic block diagram of a second embodiment of an adaptive circular polarization diversity system for radio link communication implemented as a feedback adaptive system.

Turning briefly to FIG. 2, in the case that adaptive polarization diversity system 10 is implemented as a feedback adaptive system, complex weight generator 46 determines the weights to be allocated to the signals from each of channels 26 and 28 through the application of a Least Mean Square (LMS) algorithm so as to optimally receive the modulated training pilot signal transmitted as part of a transmission from base station 12 to subscriber unit 14. As shown, complex weight generator 46 receives the digitized complex samples from ADC units 34 and 44 and an error signal from a complex subtractor 49 which subtracts the combined signal from complex adder 48 from the desired response in terms of the modulated training pilot signal.

It should be noted that complex multipliers 36 and 44, complex weight generator 46 and complex adder 48 and complex subtractor 49 can be implemented either in software or as dedicated hardware components as known in the art.

Hence, all in all, in both cases, it can be readily appreciated that dual channel receiver 24 adaptively weights signals corresponding to the clockwise and counter clockwise polarized components of the transmission received by antennas 20 and 22, respectively, so as to compensate for cross polarization of the transmission transmitted by antenna 16 caused by multi-path propagation from base station 12 to subscriber unit 14, the indeterminate orientation of antenna pair 20, and the like.

Figure 3:
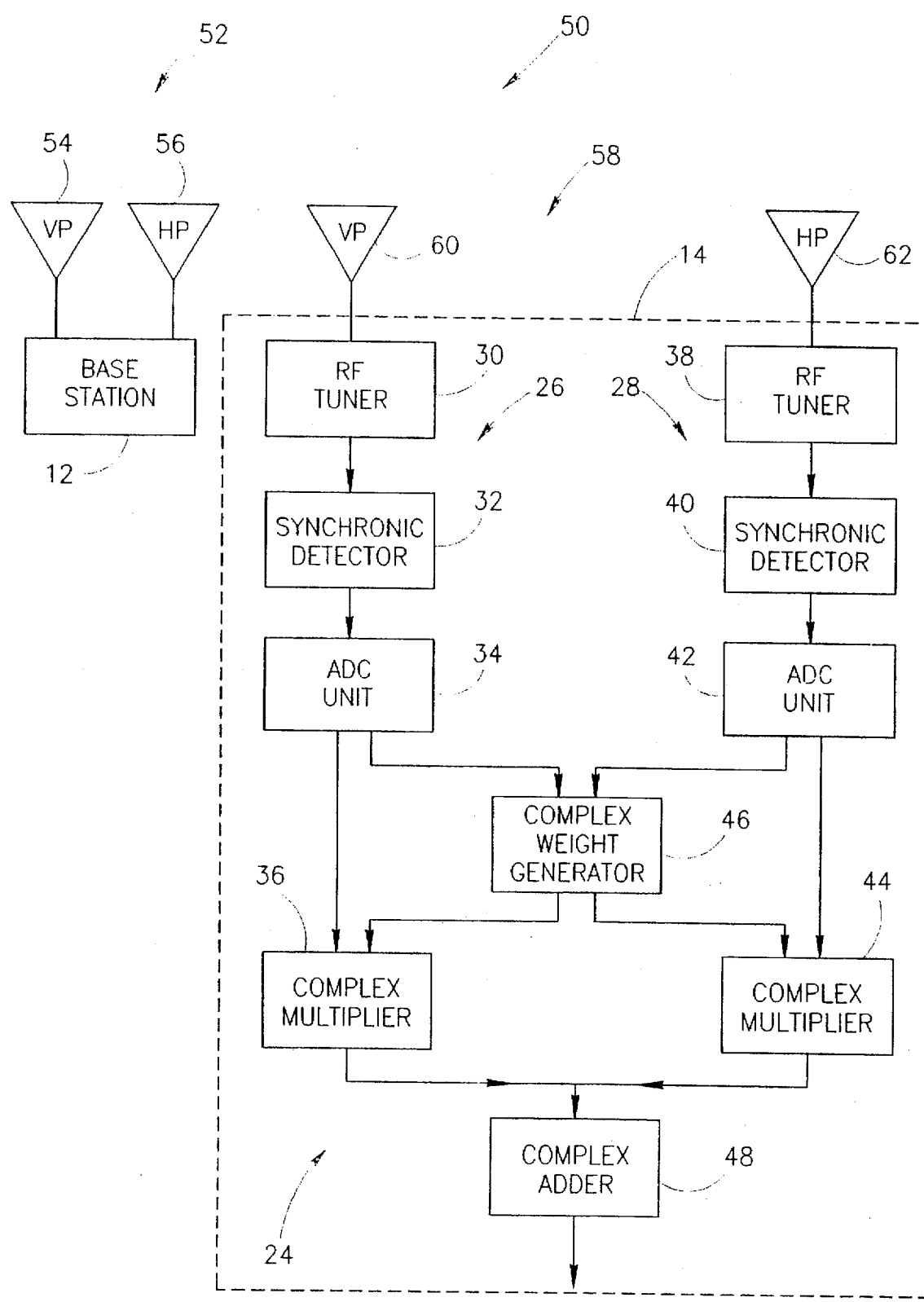
FIG. 3 is a schematic block diagram of a first embodiment of an adaptive linear orthogonal polarization diversity system for radio link communication implemented as a direct feed adaptive system.
Figure 4:
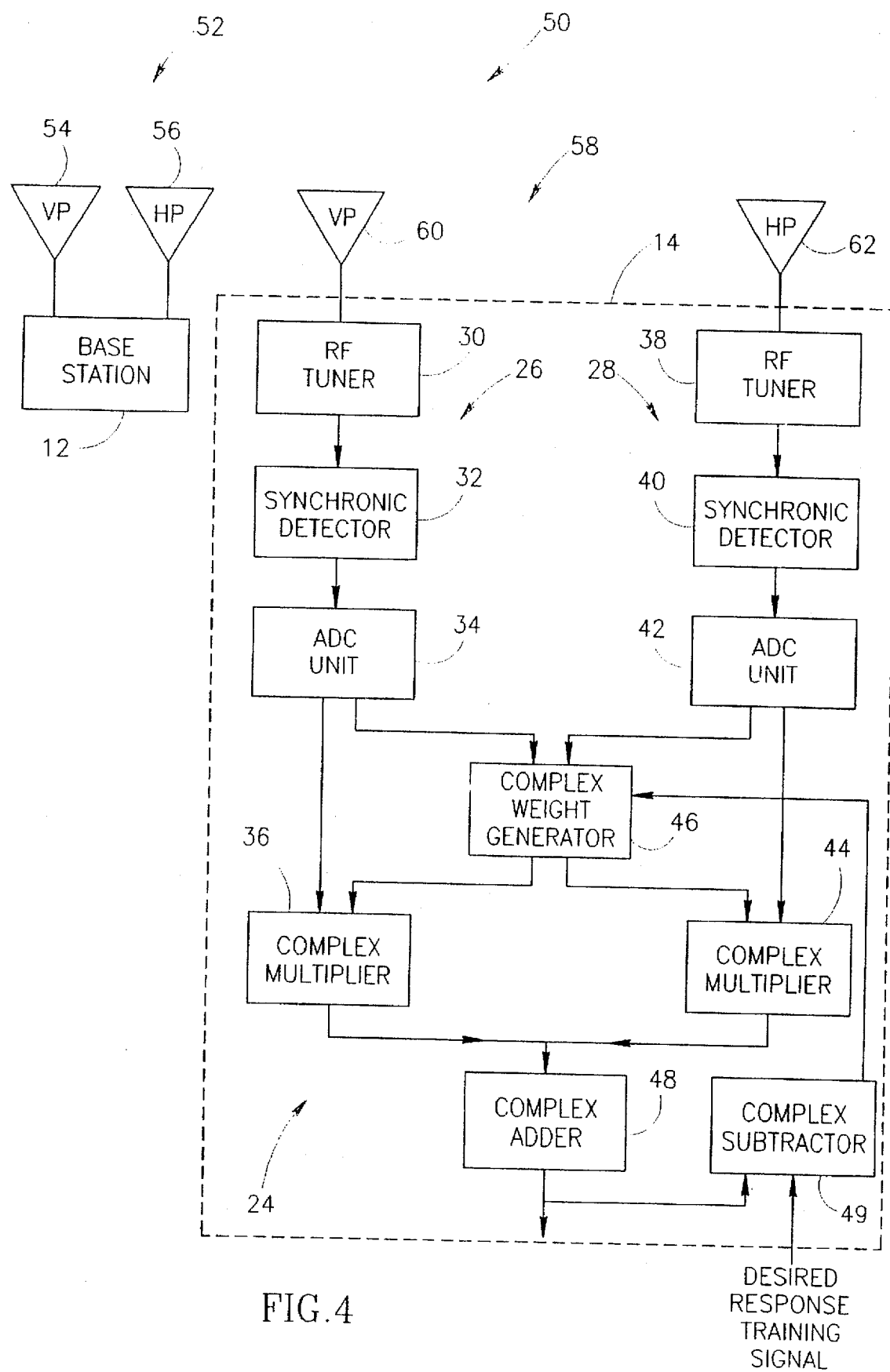
FIG. 4 is a schematic block diagram of a second embodiment of an adaptive linear orthogonal polarization diversity system for radio link communication implemented as a feedback adaptive system.

With reference now to FIGS. 3 and 4, the block diagrams illustrate other embodiments of an adaptive polarization diversity system for radio link communication, generally designated 50, constructed and operative according to the teachings of the present invention. As before, adaptive polarization diversity system 50 is depicted for downlink radio link communication from base station 12 to one or more subscriber units 14.

In this case, base station 12 includes an antenna pair 52 including a first base station antenna 54 having a first polarization and a second base station antenna 56 having a second polarization. Base station antenna 54 and base station antenna 56 are implemented such that their polarizations are orthogonal so as to ensure that cross talk between the two transmissions is at a minimum. The antennas of antenna pair 52 are preferably co-located, however, they can also be spaced from one another.

Preferably, base station antenna 54 and base station antenna 56 are implemented so that base station antenna 54 has a vertical polarization and base station antenna 56 has a horizontal polarization. However, any alignment relative to an inertial co-ordinate system can be deployed as long as the condition of orthogonality between the polarizations of the transmissions from antennas 54 and 56 is maintained.

Subscriber unit 14 includes an antenna pair 58 including a first subscriber unit antenna 60 sharing a common polarization with base station antenna 54 so as to receive vertical polarized transmissions and a second subscriber unit antenna 62 sharing a common polarization with base station antenna 56 so as to receive horizontal polarized transmissions. In a similar fashion as antenna pair 58, antennas 60 and 62 of antenna pair 58 are preferably co-located such that subscriber unit 14 can be readily realized as a vehicle mounted device or a hand held device.

Hence, subscriber unit antenna 60 is preferably implemented as a monopole antenna type so as to have a vertical polarization and subscriber unit antenna 62 is preferably implemented as a loop antenna type so as to have a horizontal polarization. As before, any other antenna implementation is acceptable for antenna pair 58 as long as the condition of orthogonality between the polarizations of antennas 60 and 62 is maintained.

It can be readily appreciated that the vertical polarized transmission received by antenna 60 typically includes a major component corresponding to the vertical polarized transmission from antenna 54 and a minor component corresponding to the horizontal polarized transmission from antenna 56 due to cross polarization thereof. In a similar manner, the horizontal polarized transmission received by antenna 62 typically includes a major component corresponding to the horizontal polarized transmission from antenna 56 and a minor component corresponding to the vertical polarized transmission from antenna 54 due to cross polarization thereof.

Therefore, adaptive polarization diversity system 50 includes dual channel receiver 24 described hereinabove except that in this case dual channel receiver 24 adaptively combines signals corresponding to the vertical and horizontal polarized transmissions received by antennas 60 and 62, respectively, so as to optimally receive a transmission from base station 12 to subscriber unit 14. As before, dual channel receiver 24 can be implemented as either a direct adaptive system or as a feedback adaptive system.

While the invention has been described with respect to a limited number of embodiments, it will be appreciated that many variations, modifications and other applications of the invention may be made.

What is claimed is:

1. Adaptive polarization diversity system for radio link communication comprising:

(a) base station antenna for transmitting either a clockwise polarized transmission or a counter-clockwise polarized transmission, said transmission including a training pilot signal; and (b) at least one subscriber unit for receiving said transmission, said at least one subscriber unit including:

i) a first subscriber unit antenna for receiving a clockwise polarized transmission, ii) a second subscriber unit antenna for receiving a counter-clockwise polarized transmission, said counter-clockwise polarized transmission carrying substantially identical informational content as said clockwise circularly polarized transmission; and iii) a dual channel receiver for adaptively combining said clockwise polarized transmission with said counter-clockwise polarized transmission in proportion to first and second weights, respectively, said dual channel receiver determining said first and second weights so as to substantially optimally receive said training pilot signal.

2. The system as in claim 1 wherein said dual channel receiver implements a Direct Matrix Inversion (DMI) algorithm for processing a number of samples from each channel thereof so as to determine said first weight and said second weight.

3. The system as in claim 1 wherein said dual channel receiver implements a Least Mean Square (LMS) algorithm for processing a number of samples from each channel thereof so as to determine said first weight and said second weight.

4. The system as in claim 1 wherein said first subscriber unit antenna is spaced from said second subscriber unit antenna.

5. The system as in claim 1 wherein said first subscriber unit antenna and second subscriber unit antenna are co-located.

6. The system as in claim 1 wherein said at least one subscriber unit is realized as a vehicle mounted device.

7. The system as in claim 1 wherein said at least one subscriber unit is realized as a hand held device.

8. Adaptive polarization diversity system for radio link communication comprising:
  (a) a base station for transmitting a transmission including a training pilot signal, said base station including:
    i) a first base station antenna for transmitting a first polarized transmission,
    ii) a second base station antenna for transmitting a second polarized transmission, said second polarized transmission being orthogonal to said first polarized transmission and carrying substantially identical informational content as said first polarized transmission; and
  (b) at least one subscribe unit a certain location for receiving said transmission, said transmission having an actual polarization at said location, said at least one subscriber unit including:
    i) a first subscriber unit antenna for receiving a first polarized transmission, said first subscriber unit antenna sharing a common polarization with said first base station antenna,
    ii) a second subscriber unit antenna for receiving a second polarized transmission, said second subscriber unit antenna sharing a common polarization with said second base station antenna, and
    iii) a dual channel receiver for adaptively combining said first polarized transmission with said second polarized transmission in proportion to first and second complex weights, respectively, said dual channel receiver determining said first and second complex weights so as to substantially optimally receive said training pilot signal by rendering an effective polarization which matches said actual polarization.

9. The system as in claim 8 wherein said dual channel receiver implements a Direct Matrix Inversion (DMI) algorithm for processing a number of samples from each channel thereof so as to determine said first weight and said second weight.

10. The system as in claim 8 wherein said dual channel receiver implements a Least Mean Square (LMS) algorithm for processing a number of samples from each channel thereof so as to determine said first weight and said second weight.

11. The system as in claim 8 wherein said first base station antenna is substantially vertically polarized and said second base station antenna is substantially horizontally polarized.

12. The system as in claim 8 wherein said first base station antenna is spaced from said second base station antenna.

13. The system as in claim 8 wherein said first base station antenna and second base station antenna are co-located.

14. The system as in claim 8 wherein said first subscriber unit antenna is spaced from said second subscriber unit antenna.

15. The system as in claim 8 wherein said first subscriber unit antenna and second subscriber unit antenna are co-located.

16. The system as in claim 8 wherein said at least one subscriber unit is realized as a vehicle mounted device.

17. The system as in claim 8 wherein said at least one subscriber unit is realized as a hand held device.

* * * * *